United States Patent [19]

Yang

[11] Patent Number: 5,854,359

[45] Date of Patent: Dec. 29, 1998

[54] PROCESS FOR MAKING POLYETHERESTER RESINS HAVING HIGH AROMATIC DIESTER CONTENT

[75] Inventor: Lau S. Yang, Wilmington, Del.

[73] Assignee: ARCO Chemical Technology, L.P., Greenville, Del.

[21] Appl. No.: 25,608

[22] Filed: Feb. 18, 1998

[51] Int. Cl.[6] ............................ C08F 20/00; C08G 63/66; C08J 11/04

[52] U.S. Cl. ........................ 525/444; 528/274; 528/275; 528/280; 528/281; 528/300; 528/301; 528/302; 528/306; 528/308; 528/308.6; 525/437; 525/444; 524/783; 524/845; 521/48; 521/48.5

[58] Field of Search ................................ 528/274, 275, 528/280, 281, 300, 301, 302, 306, 308, 308.6; 525/437, 444; 524/783, 845; 521/48, 48.5

[56] References Cited

U.S. PATENT DOCUMENTS

| | | | |
|---|---|---|---|
| 5,254,723 | 10/1993 | Yang et al. | 560/240 |
| 5,319,006 | 6/1994 | Yang et al. | 523/500 |
| 5,436,313 | 7/1995 | Klang et al. | 528/274 |
| 5,436,314 | 7/1995 | Yang et al. | 528/274 |
| 5,612,444 | 3/1997 | Cai et al. | 528/274 |

*Primary Examiner*—Samuel A. Acquah
*Attorney, Agent, or Firm*—Stephen D. Harper

[57] ABSTRACT

A process for making polyetherester resins is disclosed. A glycol ester of an aromatic diacid such as terephthalic acid is reacted with a polyether and a source of a dicarboxylic acid such as maleic anhydride to produce a polyetherester resin, wherein the aromatic diester content may be conveniently adjusted as desired. The process permits the preparation of unsaturated polyetherester resins with relatively high levels of terephthalate repeating units while avoiding the difficulties associated with the direct use of terephthalic acid in previously known procedures. Such unsaturated polyetheresters are useful for making thermoset resins with excellent mechanical and physical properties.

21 Claims, No Drawings

PROCESS FOR MAKING POLYETHERESTER RESINS HAVING HIGH AROMATIC DIESTER CONTENT

FIELD OF THE INVENTION

This invention relates to a process for making polyetheresters. In particular, the invention is a process for polyetheresters that have a high content of aromatic diester repeating units.

BACKGROUND OF THE INVENTION

Recently, a new process for making polyetherester resins from polyethers was described in U.S. Pat. No. 5,319,006. The process reacts a polyether with a cyclic anhydride such as maleic anhydride in the presence of a Lewis acid catalyst. While it is unclear precisely what chemical mechanism is occurring, the net effect of the reaction is to insert the anhydride randomly into carbon-oxygen bonds of the polyether to generate ester groups in the resulting polyetherester resin. The polyetherester resin may then be combined with a vinyl monomer such as styrene and cured to provide a polyetherester thermoset.

Later, it was discovered that strong protic acids (i.e., acids having a pKa less than 0) and metal salts thereof will also catalyze this type of insertion reaction (see U.S. Pat. No. 5,436,313). Dicarboxylic acids may also be substituted in whole or in part for the anhydride (see U.S. Pat. No. 5,436,314).

The ability to prepare thermosettable polyetheresters by random "insertion" of anhydrides and carboxylic acids into polyethers provides a convenient way of making many unique polyetherester intermediates. These polyetheresters often have favorable performance characteristics compared with polyesters made by conventional esterification processes. Unfortunately, the "insertion" process does not work particularly well with high melting aromatic dicarboxylic acids such as isophthalic and terephthalic acids. Such acids have limited solubility or miscibility in the polyether-containing reaction mixture, even at the relatively high reaction temperatures typically employed. Aromatic dicarboxylic acids are commonly formulated into conventional unsaturated polyester resins to impart good mechanical properties and chemical resistance to thermosets made from the resin.

A two step process for making polyetheresters having a high content of aromatic ester recurring units is described in U.S. Pat. No. 5,612,444. In the first step, a low molecular weight polyether polyol is reacted with an aromatic dicarboxylic acid to produce a polyester intermediate. In the second step, the polyester intermediate is reacted with an anhydride or aliphatic dicarboxylic acid in the presence of a catalyst effective to promote random insertion of the anhydride or dicarboxylic acid into polyether segments of the polyester intermediate. While this two step process has proven to be quite useful, particularly for the preparation of polyetherester resins containing relatively high levels of isophthalic acid, it does have certain limitations. In particular, the incorporation of relatively large proportions of recurring units derived from terephthalic acid is still quite difficult due to the much higher melting point of terephthalic acid as compared to other aromatic dicarboxylic acids such as isophthalic acid. Thus, it would be extremely desirable to develop new polyetherester processes which would facilitate the inclusion of terephthalic acid at high levels in order to further enhance the performance of the polyetherester in thermoset formulations.

SUMMARY OF THE INVENTION

This invention provides a method of making a polyetherester resin comprised of aromatic diester repeating units comprising reacting a glycol ester of an aromatic diacid, a polyether and a dicarboxylic acid source at a temperature and in the presence of a catalyst effective to accomplish insertion of the aromatic diacid and the dicarboxylic acid source into the polyether to form the polyetherester resin.

In a preferred embodiment, the invention provides a method of making an unsaturated polyetherester resin comprised of terephthalate repeating units comprising reacting a 2-methyl-1,3-propanediol ester of terephthalic acid, a polyether polyol having an average hydroxyl functionality of from 2 to 6 and a number average molecular weight of from 400 to 12,000, and an unsaturated cyclic anhydride at a temperature and in the presence of a protic acid catalyst having a pKa of less than 0 effective to accomplish insertion of the terephthalic acid and unsaturated cyclic anhydride into the polyether polyol to form the unsaturated polyetherester resin.

The glycol ester of the aromatic diacid may be advantageously obtained by digesting polyethylene terephthalate (recovered from a waste or recycle stream, for example) with the glycol. Alternatively, the glycol ester may be produced by transesterification of glycol and an alkyl ester of terephthalic acid.

DETAILED DESCRIPTION OF THE INVENTION

In the process of the invention, a glycol ester of an aromatic diacid, a polyether and a dicarboxylic acid source are reacted. Suitable aromatic diacids are those commonly used in the polyester industry and are typically high melting solids. Examples include phthalic acid, isophthalic acid, terephthalic acid, halogenated derivatives of these, and mixtures thereof. The process of this invention is particularly well-suited for the synthesis of polyetheresters containing terephthalate ester repeating units (i.e., repeating units derived from terephthalic acid).

The aromatic diacid is derivatized with a glycol to form the glycol ester. Glycols are dihydric alcohols (i.e., organic compounds containing two hydroxy groups). The use of $C_3$ to $C_{10}$ glycols, aliphatic glycols, linear unsubstituted glycols containing an odd number of carbon atoms, and/or branched glycols is particularly preferred in this invention, since these types of glycols have been found to be especially effective in rendering the aromatic diacid more soluble or miscible in the mixture of reactants and/or lowering the melting point of the aromatic diacid. An example of an especially preferred glycol for such purpose is 2-methyl-1,3-propanediol. Other suitable glycols for esterification of the aromatic diacid include, but are not limited to, propylene glycol, neopentyl glycol, 1,3-propanediol, 1,4-butanediol, 1,3-butanediol, ethylene glycol, and the like. Mixtures of different glycols may be utilized. Glycol esters of carboxylic acids other than aromatic diacids may be used in combination with the aromatic diacid glycol esters, if so desired.

Each aromatic diacid molecule is desirably substituted with approximately two molecules of glycol, although some proportion of the carboxylic acid groups of the aromatic diacid may be in free acid form or be substituted with a group other than a glycol (e.g., an alkyl group). The resulting glycol ester thus will generally contain an "internal" aromatic diester group

derived from the aromatic diacid, with terminal hydroxy-substituted hydrocarbyl units (—R—OH) derived from the glycol attached thereto through ester groups.

One convenient and inexpensive source of the glycol ester of the aromatic diacid is to digest (depolymerize) polyethylene terephthalate with the desired glycol or mixture of glycols. The polyethylene terephthalate may be virgin resin or may advantageously be recycled or waste material. The digestion (which may also be considered a glycolysis reaction) may be carried out in any manner known in the art. For example, the polyethylene terephthalate may be reacted with 0.7 to 1.3 equivalents of the desired glycol at a temperature of 150° C. to 250° C. in the presence of an effective amount of a suitable transesterification catalyst such as zinc acetate. The digestion need not be continued any longer than the minimum time necessary to completely liquefy the polyethylene terephthalate or render it miscible when combined with the other reactants used in the present process for making polyetherester resins.

An alternative procedure for preparing the glycol ester of the aromatic diacid is to react a dialkyl diester of the aromatic diacid with the glycol or mixture of glycols under conditions effective to accomplish transesterification. The alkyl groups on the dialkyl diester are preferably relatively short chain (i.e., $C_1$–$C_4$) alkyl groups so that the aliphatic alcohol generated during transesterification may be readily separated from the desired glycol ester by distillation or other suitable means. Conditions and catalysts effective for accomplishing transesterifications of this type are well-known in the art. The glycol ester of the aromatic diacid may also be obtained by direct esterification of the aromatic diacid with the glycol, using conventional procedures.

Polyethers suitable for use in the invention are those derived from catalyzed ring-opening polymerization of cyclic ethers such as epoxides, oxetanes, oxolanes, and the like. The polyethers have repeat units of oxyalkylene groups (—O—A—) in which A has from 2 to 10 carbon atoms, preferably from 2 to 4 carbon atoms. The presence of oxypropylene groups, either exclusively or in combination with other types of oxyalkylene groups, is especially preferred. The polyethers can have different end groups, depending upon how the polyethers are made or modified. For example, the polyether can have hydroxyl, ester, ether, acid, olefinic, or amino end groups, or the like or combinations of these. Mixtures of different types of polyethers can be used.

Preferred polyethers for the process of the invention are polyether polyols (i.e., polyethers having hydroxyl end groups). Suitable polyether polyols include, for example, polyoxypropylene polyols, polyoxyethylene polyols, ethylene oxide-propylene oxide copolymers, polytetramethylene ether glycols, oxetane polyols, and polymers of tetrahydrofuran and epoxides. Typically, these polyols will have average hydroxyl functionalities from about 2 to about 6, and number average molecular weights from about 400 to about 12,000. The polyether polyols can be recycled polyols derived from a polyurethane foam, elastomer, sealant, or the like.

The dicarboxylic acid source used in the process of this invention may be utilized as a means of introducing repeating units of dicarboxylic acids other than the aromatic diacid or diacids which are esterified with the glycol. For example, the dicarboxylic acid source may be an aliphatic dicarboxylic acid or equivalent thereof such as an anhydride. The dicarboxylic acid source may also be an aromatic diacid such as isophthalic acid, phthalic acid or terephthalic acid or an equivalent thereof such as an anhydride or ester. Preferably, however, the dicarboxylic acid source is based on an acid other than a aromatic diacid since, as noted earlier, there are limits to how much aromatic diacid can be introduced into the polyetherester resin directly in such manner because of solubility and melting point considerations.

Preferred for use as the dicarboxylic acid source are linear, branched and cyclic $C_3$–$C_{40}$ aliphatic dicarboxylic acids and anhydrides thereof, including both saturated and unsaturated species. Examples of particularly preferred dicarboxylic acid sources include maleic acid, fumaric acid, glutaric acid, succinic acid, malonic acid, pimelic acid, citraconic acid, itaconic acid, suberic acid, tetrahydrophthalic acid, maleic anhydride, succinic anhydride, itaconic anhydride, citraconic anhydride, tetrahydrophthalic anhydride, and the like. Where unsaturated polyetheresters are desired, the use of maleic acid and/or maleic anhydride is especially desirable.

The glycol ester of the aromatic diacid, the polyether and the dicarboxylic acid source react in the presence of a catalyst that promotes insertion of the aromatic diacid and dicarboxylic acid into the polyether (an "insertion catalyst"). Suitable insertion catalysts include Lewis acids, protic acids that have a pKa less than about 0, and metal salts of the protic acids. The insertion catalyst is used in an amount effective to promote insertion into polyether carbon-oxygen bonds.

In one convenient embodiment of the invention, the glycol ester, the polyether and the dicarboxylic acid source are simply combined in a suitable reaction vessel and heated. In other embodiments of the invention, however, two of the reactants may be prereacted prior to reaction with the third reactant. For example, the glycol ester and the dicarboxylic acid source may be first reacted to derivatize the hydroxyl groups of the glycol ester with the dicarboxylic acid source. A glycol ester having the general structure glycol-terephthalic acid-glycol, for instance, may be reacted with maleic anhydride to form an oligomeric species having the general structure maleic acid-glycol-terephthalic acid-glycol-maleic acid, which may thereafter be "inserted" into the polyether in accordance with the process described herein. As will be recognized by those skilled in the art, the aforementioned oligomeric species may be inserted intact into the polyether or may undergo interesterification and/or transesterification with other components of the reaction mixture such that the individual repeating units of the oligomeric species become disassociated from each other in the course of the insertion process. Where the dicarboxylic acid source is an anhydride, the reaction with the glycol ester is generally quite facile and can typically be accomplished at mild temperatures in the absence of any catalyst. If the dicarboxylic acid source is in free acid form, however, higher temperatures and/or an esterification catalyst may be needed. Removal of the water generated by esterification of the glycol ester with the free acid may also be desirable.

Preferred Lewis acids are metal halides of the formula $MX_n$, wherein M is a metal having an oxidation number from 2 to 4, X is a halogen, and n is an integer from 2 to 4. Examples of suitable Lewis acids are zinc chloride, zinc bromide, stannous chloride, stannous bromide, aluminum chloride, ferric chloride, boron trifluoride, and the like, and mixtures thereof. Most preferred are zinc chloride and zinc bromide. When a Lewis acid catalyst is used, it is preferred to use an amount within the range of about 0.01 to about 5 wt. % based on the amount of polyester intermediate. Additional examples of suitable Lewis acids are found in U.S. Pat. No. 5,319,006, the teachings of which are incorporated herein by reference.

Protic acids (organic and inorganic) that have a pKa less than about 0 are also useful as insertion catalysts. Generally, the acids will be stronger than organic carboxylic acids. Suitable acids include sulfonic acids such as arylsulfonic acids, alkylsulfonic acids, and halogenated alkyl- and arylsulfonic acids. Also suitable are hydrogen halides, halosulfonic acids, tetrafluoroboric acid, heteropolyacids, and sulfuric acid. Mixtures of different acids can be used. Examples include p-toluenesulfonic acid, trifluoromethanesulfonic acid (triflic acid), trichloromethanesulfonic acid, hydrochloric acid, phosphotungstic acid, and the like. Preferred protic acids are sulfuric acid, p-toluenesulfonic acid, and phosphotungstic acid. When a protic acid is used as the catalyst, it is generally preferred to use an amount within the range of about 0.01 to about 1 wt. % based on the amount of polyester intermediate. A more preferred range is from about 0.01 to about 0.3 wt. %. Additional examples of suitable protic acids are found in U.S. Pat. No. 5,436,313, the teachings of which are incorporated herein by reference. Metal salts derived from protic acids that have a pKa less than about 0 are also effective insertion catalysts. Preferred salts are metal salts of arylsulfonic acids, alkylsulfonic acids, halogenated aryl- and alkylsulfonic acids, tetrafluoroboric acid, sulfuric acid, heteropolyacids, and halosulfonic acids. Sulfonic acid salts, especially triflate salts, are particularly preferred. Preferably, the metal is selected from Group IA, IIA, IIB, IB, IIIA, IVA, VA, and VIII. Thus, the metal can be, for example, lithium, potassium, magnesium, zinc, copper, aluminum, tin, antimony, iron, nickel. Examples of suitable metal salts are lithium triflate, sodium triflate, magnesium triflate, zinc triflate, copper(II) triflate, zinc tetrafluoroborate, zinc p-toluenesulfonate, aluminum triflate, iron(II) tetrafluoroborate, tin(II) triflate, and the like, and mixtures thereof. When a metal salt is used as the catalyst, it is preferably used in an amount within the range of about 1 part per million ($10^{-4}$ wt. %) to about 1 wt. % based on the amount of polyether. A more preferred range is from about 0.01 wt. % to about 0.3 wt. %. Additional examples of suitable metal salts of protic acids are found in U.S. Pat. No. 5,436,313, the teachings of which are incorporated herein by reference.

The reaction temperature is preferably within the range of about 80° C. to about 250° C.; a more preferred range is from about 100° C. to about 220° C. Most preferably, the reaction temperature is maintained between about 150° C. to 200° C. The reaction is normally complete within about 4–12 h at temperatures within the preferred temperature ranges. The progress of the reaction can be followed by measuring the acid number, which will decrease and level off as the reaction proceeds. Without wishing to be bound by theory, it is believed that the hydroxy groups of the glycol ester react with the dicarboxylic acid source such that said hydroxy groups are thereby esterified with one of the two carboxylic acid groups (or equivalent thereof) in the dicarboxylic acid source. The other carboxylic acid group derived from the dicarboxylic acid source participates in the reaction which leads to insertion into the polyether component.

The polyetherester resin contains diester repeating units (derived from the aromatic diacid introduced by means of its glycol ester as well from the dicarboxylic acid source), oxyalkylene repeating units (derived from the glycol component in the glycol ester of the aromatic diacid), and recurring polyether "blocks" (derived from the polyether; typically, each such block will contain, on average, from about 3 to 6 oxyalkylene (e.g., oxyethylene, oxypropylene) repeating units). Where the polyetherester resin is an unsaturated resin to be used as a component in the preparation of a thermoset which also contains a vinyl monomer such as styrene, it is preferred that the ether/ester mole ratio be at least about 0.5. Such resins generally will have number average molecular weights within the range of about 500 to about 10,000.

The relative amounts of glycol ester, polyether, and dicarboxylic acid source employed may be varied within quite wide limits and may be readily adjusted as needed to provide a polyetherester resin having the desired aromatic diacid content, ether/ester molar ratio, unsaturation level, molecular weight and so forth. Typically, however, the process of the present invention will utilize 20 to 70 weight percent polyether, 10 to 50 weight percent dicarboxylic acid source and 5 to 60 weight percent glycol ester (where the total amount of polyether, dicarboxylic acid source, and glycol ester is equal to 100 percent).

The process of the invention is conveniently performed by combining the glycol ester, the polyether, the dicarboxylic acid source, and the catalyst in any desired order or manner. The process can be performed batchwise, semi-batchwise or continuously as desired. It is preferred to perform the process under an inert atmosphere of nitrogen, argon or the like. Preferably, the mixture of reactants is well agitated.

If so desired, the temperature and pressure within the reactor may be manipulated such that all or a portion of the lighter components of the reaction mixture which may form during the insertion process such as water, dimers and trimers of glycols (e.g., dipropylene glycol, tripropylene glycol), acetals, aldehydes and the like may be removed as an overhead stream from the reaction mixture.

The resulting product is a polyetherester resin that preferably contains at least about 10 wt. % of recurring units derived from the aromatic diacid. The polyetherester resin may contain much higher levels of recurring units derived from the aromatic diacid, however, if so desired. The optimum level of aromatic diester repeating units will depend upon the end use application. The process of this invention permits the convenient preparation of polyetherester resins over an exceptionally broad composition range.

Heating is typically continued until a polyetherester resin that has an acid number within the range of about 75 to about 200 mg KOH/g is produced; a more preferred range is from about 90 to about 150 mg KOH/g; most preferred is the range from about 110 to about 130 mg KOH/g.

The polyetherester resin prepared as described above commonly has a large proportion of carboxylic acid end groups. In some embodiments, the resin will be essentially free of hydroxyl end groups. This resin can be used "as is" to make a polyetherester thermoset. Preferably, it is modified in one of two ways before using it to make a polyetherester thermoset or polyurethane. One way to modify the resin is to continue heating it to further react the polymer and reduce its acid number, preferably to about 60 mg KOH/g or less. This method is generally the less desirable of the two because excessive heating and prolonged reaction times are needed to achieve a resin having a low enough acid number. The second and more preferred method, which is described further below, is to reduce the acid number by heating the polyetherester resin in the presence of a glycol.

The initially obtained polyetherester resin having an acid number within the range of about 75 to about 200 mg KOH/g is preferably heated with a glycol to produce a glycol-capped polyetherester resin that has a reduced acid number. Suitable glycols generally will have molecular weights less than about 200. Suitable glycols include, for example, propylene glycol, ethylene glycol, diethylene glycol, dipropylene glycol, tripropylene glycol, 1,4-butanediol, 1,3-propanediol, 2-methyl-1,3-propanediol, neopentyl glycol, and the like, and mixtures thereof. Particularly preferred are propylene glycol, neopentyl glycol, and 2-methyl-1,3-propanediol.

The amount of glycol used is preferably at least about 1 equivalent of glycol for each residual carboxylic acid end group. Typically, this amounts to heating the polyetherester resin with at least about 5–20 wt. % of the glycol. The glycol is typically heated with the polyetherester resin at the same temperature as that used for the insertion reaction until the acid number of the glycol-capped polyetherester resin drops to the desired level. Any excess glycol is removed by stripping.

The polyetherester resin is preferably heated in the presence of the glycol to produce a glycol-capped polyetherester resin that has an acid number within the range of about 10 to about 90 mg KOH/g; a more preferred range is from about 15 to about 50 mg KOH/g.

Polyetherester resins and glycol-capped polyetherester resins of the invention that contain some ethylenic unsaturation are useful for preparing polyetherester thermosets. The thermoset is made by reacting the unsaturated resin with a vinyl monomer in the presence of a free-radical initiator under conditions effective to produce a polyetherester thermoset. The techniques are essentially the same as those used in the polyester industry to prepare unsaturated polyester thermosets from unsaturated polyester resins.

Preferred vinyl monomers are vinyl aromatic monomers, acrylates, methacrylates, and allyl esters. Suitable vinyl monomers include, for example, styrene, methyl methacrylate, methyl acrylate, diallyl phthalate, divinylbenzene, α-methylstyrene, and the like, and mixtures thereof. Styrene is particularly preferred.

The polyetherester resins are often blended with a vinyl monomer (typically styrene) and an inhibitor such as hydroquinone, tert-butylcatechol, or the like, or mixtures thereof, and the solution is stored until needed.

The polyetherester resin solution can be used to make a clear casting by combining it with a free-radical initiator, preferably a peroxide such as benzoyl peroxide, tert-butylperbenzoate, or the like, pouring the mixture into a mold, and heating it to effect a cure. If desired, other additives can be included in the thermosets, including, for example, fillers, pigments, chopped glass, glass mat, low-profile additives, flame retardants, and the like.

EXAMPLES

Examples 1–5 and Comparative Example 6

Examples 1–5 demonstrate the process of the invention using polyethylene terephthalate as the aromatic diacid glycol ester component. In each example, the polyethylene terephthalate was first digested with one equivalent of 2-methyl-1,3-propanediol at 190° C. to 220° C. in the presence of about 100 to 500 ppm zinc acetate as a catalyst. Once the polyethylene terephthalate had been completely liquefied, maleic anhydride, polyether polyol (3000 number average molecular weight propoxylated glycerin) and p-toluene sulfonic acid catalyst (700–1000 ppm) were added and the reaction mixture heated at 190° C. for several hours until an acid number of between 60 and 120 was reached. The reaction product was then capped with additional 2-methyl-1,3-propanediol to lower the acid number further to between 30 and 50. Thereafter, the unsaturated polyetherester resin is cooled to 120° C. and blended with styrene (40%) to provide a resin solution suitable for curing with an appropriate free radical initiator. The aforedescribed procedure in each case took about 20 hours to complete.

To cure the polyetherester resin solution to a thermoset for measurement of mechanical properties, the resin solution was combined with 0.25 weight percent of a 6 weight percent cobalt naphthenate solution in mineral oil and 1.5 weight percent of a 9 weight percent methyl ethyl ketone peroxide solution (available as "DDM-9" from Atochem). The resulting mixture was poured into a glass mold and kept at room temperature overnight. The hardened plates were postcured in an air oven at 100° C. for 5 hours. Samples were then cut and tested according to the corresponding ASTM methods listed in Table I.

Increasing the proportion of polyethylene terephthalate while holding the maleic anhydride content constant at 25 weight percent resulted in significant improvement in tensile strength, flexural strength and heat resistance (as measured by DTUL). Comparative Example 6, which was prepared in the absence of any polyethylene terephthalate or derivative thereof, exhibited much poorer physical properties.

TABLE I

| Example | 1 | 2 | 3 | 4 | 5 | 6* |
|---|---|---|---|---|---|---|
| Maleic Anhydride, wt. % | 25 | 25 | 25 | 25 | 25 | 25 |
| PET, wt. % | 15 | 20 | 25 | 30 | 35 | 0 |
| Polyether Polyol, wt. % | 49 | 45 | 35 | 31 | 29 | 63 |
| Tensile Strength, psi (ASTM D-638) | 6200 | 7200 | 8200 | 9400 | 10,500 | 5000 |
| Tensile Elongation, % | 6.5 | 4.5 | 4.0 | 3.8 | 3.9 | 2.0 |
| Flex Strength, psi (ASTM D-790) | 10,900 | 12,500 | 15,500 | 16,800 | 19,000 | 9000 |
| DTUL, °F. (ASTM D-648) | 141 | 156 | 170 | 185 | 190 | 100 |

*Comparative

Examples 7–9

These examples demonstrate the effect on the physical properties of a cured resin of keeping the polyethylene terephthalic content constant and varying the maleic anhydride content of a polyetherester resin prepared in accordance with the invention. The synthetic procedure employed in Examples 1–5 was employed, except that the polyether polyol used was a 6000 number average molecular weight propoxylated glycerin. As Table II shows, increasing the maleic anhydride content of the polyetherester resin improves tensile strength, flexural strength and heat resistance.

TABLE II

| Example | 7 | 8 | 9 |
|---|---|---|---|
| Maleic Anhydride, wt. % | 20 | 25 | 30 |
| PET, wt. % | 30 | 30 | 30 |
| Polyether Polyol, wt. % | 35 | 30 | 23 |
| Tensile Strength, psi (ASTM D-638) | 8300 | 8600 | 9000 |
| Tensile Elongation, % | 3 | 2.7 | 2.5 |
| Flex Strength, psi (ASTM D-790) | 14,200 | 15,600 | 16,000 |
| DTUL, °F. (ASTM D-648) | 168 | 199 | 245 |

Examples 10–16

These examples illustrate the embodiment of the invention wherein the glycol ester of terephthalic acid is obtained by transesterification of the dimethylester of terephthalic acid with 2-methyl-1,3-propanediol. A 4 liter reactor equipped with a Dean Stark trap was charged with 350 g dimethyl terephthalate, 400 g 2-methyl 1,3-propanediol and 0.15 g zinc acetate. The contents of the reactor were heated. Methanol began to collect in the trap at about 160° C.; heating was continued until methanol evolution stopped at about 220° C. A total of 115 g methanol was collected. The mixture was cooled to 150° C., then 525 g maleic anhydride, 2200 g of a 2000 molecular weight polypropylene glycol, and 3.5 g p-toluene sulfonic acid were added and the mixture heated at 195° C. until the acid number dropped to 90 mg KOH/g. An additional 170 g 2-methyl-1,3-propanediol was added and heating continued until a final acid number of about 30 mg KOH/g was achieved. The mixture was cooled to 120° C. and blended with styrene to give a polyetherester resin solution. Small amounts of stabilizers such as hydroquinone (100 ppm) and t-butyl hydroquinone (100 ppm) were also added to improve the storage stability of the solution. Table III shows the effect of varying the proportions of the reactants on the physical properties of a thermoset prepared from the polyetherester resin.

TABLE III

| Example | 10 | 11 | 12 | 13 | 14 | 15 | 16 |
|---|---|---|---|---|---|---|---|
| Maleic Anhydride, wt. % | 15 | 15 | 15 | 25 | 25 | 25 | 22 |
| Dimethyl Terephthalate, wt. % | 10 | 15 | 33 | 15 | 20 | 25 | 30 |
| Polyether Polyols, wt. 5 | 63 | 56 | 31 | 41 | 33 | 30 | 24 |
| Tensile Strength, psi (ASTM D-638) | 720 | 1200 | 5000 | 5500 | 6900 | 8600 | 8500 |
| Tensile Elongation, % | 35 | 30 | 12.5 | 5.3 | 5.1 | 4.9 | 2.6 |
| Flex Strength, psi (ASTM D-796) | | | 11,200 | 10,500 | 12,500 | 16,000 | 18,800 |
| DTUL, °F. (ASTM D-648) | | | 117 | 146 | 152 | 176 | 170 |

I claim:

1. A method of making a polyetherester resin comprised of aromatic diester repeating units comprising reacting a glycol ester of an aromatic diacid, a polyether and a dicarboxylic acid source at a temperature and in the presence of a catalyst effective to accomplish insertion of the aromatic diacid and the dicarboxylic acid source into the polyether to form the polyetherester resin.

2. The method of claim 1 wherein the glycol ester of the aromatic diacid is obtained by digestion of polyethylene terephthalate with a glycol.

3. The method of claim 2 wherein the glycol is a $C_2$–$C_6$ aliphatic glycol.

4. The method of claim 1 wherein the glycol ester of the aromatic diacid is obtained by transesterification of an alkyl ester of the aromatic diacid and a glycol.

5. The method of claim 4 wherein the glycol is a $C_2$–$C_6$ aliphatic glycol.

6. The method of claim 1 wherein the dicarboxylic acid source is a cyclic anhydride.

7. The method of claim 6 wherein the cyclic anhydride is maleic anhydride.

8. The method of claim 1 wherein the catalyst is selected from the group consisting of Lewis acids, protic acids having a pKa of less than 0, and metal salts of said protic acids.

9. The method of claim 1 wherein the polyether is a polyether polyol having an average hydroxyl functionality within the range of 2 to 6 and a number average molecular weight within the range of 400 to 12,000.

10. The method of claim 1 wherein the polyether is comprised of oxypropylene repeating units.

11. The method of claim 1 comprising an additional step of end-capping the polyetherester resin with a glycol.

12. The method of claim 1 wherein the glycol ester and the dicarboxylic acid source are reacted prior to reacting with the polyether.

13. A method of making an unsaturated polyetherester resin comprised of terephthalate repeating units comprising reacting a 2-methyl-1,3-propanediol ester of terephthalic acid, a polyether polyol comprised of oxypropylene repeating units and having an average hydroxyl functionality of from 2 to 6 and a number average molecular weight of from 400 to 12,000, and an unsaturated cyclic anhydride at a temperature and in the presence of a protic acid catalyst having a pKa of less than 0 effective to accomplish insertion of the terephthalic acid and unsaturated cyclic anhydride into the polyether polyol to form the unsaturated polyetherester resin.

14. The method of claim 13 wherein the 2-methyl-1,3-propanediol ester of terephthalic acid is obtained by digestion of polyethylene terephthalate with 2-methyl-1,3-propanediol.

15. The method of claim 13 wherein the 2-methyl-1,3-propanediol ester of terephthalic acid is obtained by transesterification of a $C_1$–$C_4$ alkyl ester of terephthalic acid and 2-methyl-1,3-propanediol.

16. The method of claim 13 wherein the strong protic acid is a sulfonic acid.

17. The method of claim 13 comprising an additional step of end-capping with a glycol selected from the group consisting of ethylene glycol, propylene glycol, neopentyl glycol, 1,3-propanediol, 1,4-butanediol, 2-methyl-1,3-propanediol and mixtures thereof.

18. The method of claim 13 wherein the unsaturated cyclic anhydride is maleic anhydride.

19. The method of claim 13 wherein the unsaturated polyetherester resin has an acid number in the range of 75 to 200 mg KOH/g.

20. The method of claim 13 wherein the unsaturated polyetherester resin is comprised of at least 10 percent by weight of terephthalate repeating units.

21. The method of claim 13 wherein the 2-methyl-1,3-propanediol ester and the unsaturated cyclic anhydride are reacted prior to reacting with the polyether polyol.

* * * * *